(12) United States Patent
Kato et al.

(10) Patent No.: US 9,751,531 B2
(45) Date of Patent: Sep. 5, 2017

(54) CRUISE CONTROLLER (71) Applicant: HONDA MOTOR CO., LTD., Tokyo (JP)

(72) Inventors: Daichi Kato, Saitama (JP); Toru Kokaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 14/666,744

(22) Filed: Mar. 24, 2015

(65) Prior Publication Data

US 2015/0375744 A1 Dec. 31, 2015

(30) Foreign Application Priority Data

Jun. 27, 2014 (JP) ................. 2014-132650

(51) Int. Cl.
B60W 30/16 (2012.01)
(52) U.S. Cl.
CPC ......... B60W 30/16 (2013.01); B60W 2420/42 (2013.01); B60W 2550/146 (2013.01); B60W 2550/302 (2013.01); B60W 2550/306 (2013.01); B60W 2550/308 (2013.01); B60W 2720/10 (2013.01)
(58) Field of Classification Search
CPC combination set(s) only.
See application file for complete search history.

(56) References Cited

U.S. PATENT DOCUMENTS 7,647,153 B2 * 1/2010 Sugano ............ B60K 31/0008
342/70
2011/0301779 A1 * 12/2011 Shida ............... G01S 5/0072
701/1

FOREIGN PATENT DOCUMENTS

JP 07-076237 3/1995
JP 2004-206267 7/2004

* cited by examiner

Primary Examiner — Thomas G Black
Assistant Examiner — Ana Thomas
(74) Attorney, Agent, or Firm — Rankin, Hill & Clark LLP (57) ABSTRACT

When the object detection unit 10 detects the front vehicle X, the speed of the own vehicle 2 is controlled using a detection value of the state of the front vehicle (position, speed) detected by the front vehicle state detection unit 15, and, in the lost state where the front vehicle X is not detected, the speed of the own vehicle 2 is controlled using an estimation value of the state of the front vehicle by the lost front-vehicle state estimation unit 22 based on a condition that a length of the scheduled traveling route of the own vehicle 2 is shorter than a predetermined threshold in the detection target range by the object detection unit 10 as a necessary condition.

6 Claims, 5 Drawing Sheets

CRUISE CONTROLLER

BACKGROUND OF THE INVENTION

1. Field of the Invention

The present invention relates to a device to perform cruise control of the own vehicle while recognizing another vehicle traveling in front.

2. Description of the Related Art

Conventionally a technique is known, enabling cruise control of the own vehicle so as to follow another vehicle traveling in front (hereinafter this may be called a front vehicle) while recognizing the position or the speed of the front vehicle with an object detection unit thereof having a radar, a camera or the like.

A device performing this type of cruise control may cause a lost state in some cases, in which when the front vehicle travels while corning along a curve, for example, such a front vehicle may deviate from the detection target area (e.g., shooting area of the camera or searching area of the radar) of the object detection unit installed in the own vehicle and so the object detection unit fails to detect (loses) the front vehicle.

To cope with such a situation, JP 2004-206267 A (hereinafter called Patent Literature 1) and JP H7-76237 A (hereinafter called Patent Literature 2), for example, describe a technique of estimating the position or the speed of a front vehicle for cruise control of the own vehicle.

Patent Literature 1 describes a technique of, when a lost state occurs so that a front vehicle cannot be detected by its object detection unit, calculating the radius of the curve based on information detected with a steering sensor and a yaw rate sensor, and estimating the current position of the front vehicle using such a radius of the curve, or estimating the current position of the front vehicle using a past position of the front vehicle or the like.

Patent Literature 2 describes a technique of, when a lost state occurs so that a front vehicle cannot be detected by its object detection unit, of estimating the speed of the front vehicle (relative speed with reference to the own vehicle) by extrapolation based on the past speed data of the front vehicle.

SUMMARY OF THE INVENTION

Meanwhile such a lost state causing a failure to detect a vehicle traveling in front by an object detection unit having a camera, a radar or the like may occur in another case where the front vehicle deviates from the route where the own vehicle is supposed to travel (hereinafter called a scheduled traveling route) to another route because the front vehicle turns right or left, for example.

Conventional techniques as in Patent Literatures 1 and 2, however, do not consider such a situation. Such techniques then often cause the situation of performing cruise control of the own vehicle by estimating the position or the speed of another vehicle that deviates from the scheduled traveling route of the own vehicle (i.e., such a vehicle is no longer the front vehicle to be followed) so as to let the own vehicle follow such another vehicle.

The techniques as in Patent Literatures 1 and 2 may cause the following inconvenience when a lost state occurs because a front vehicle travels while cornering along a curve or the like of the scheduled traveling route of the own vehicle as well.

That is, when the front vehicle travels along a circular road such as sharp curve having a small curvature radius, the actual speed of such a front vehicle often varies (accelerates or decelerates) due to a change in curvature radius of the circular road. In general it is difficult to estimate the position or the speed of the front vehicle in such a situation reliably by the conventional techniques as in Patent Literatures 1 and 2.

This often results in the case where the estimated position of the front vehicle is away from the own vehicle as compared with the actual position, or the estimated speed of the front vehicle is larger than the actual speed, for example.

As a result, the actual following state of the own vehicle to the front vehicle may be different from the following state to be achieved.

In view of such circumstance, it is an object of the present invention to provide a cruise controller enabling appropriate traveling of the own vehicle when a lost state occurs so that the vehicle cannot detect another vehicle traveling in front.

In order to fulfill the aforementioned object, a cruise controller of the present invention is installed in a vehicle as an own vehicle that performs cruise control of the own vehicle so as to follow a front vehicle traveling ahead of the own vehicle, and includes: an object detection unit configured to detect, in a predetermined detection target range on a front side of the own vehicle, a front vehicle existing in the predetermined detection target range; a front vehicle state detection unit configured to detect a state of the front vehicle, including at least any one of a position or a speed of the front vehicle that is detected by the object detection unit; a lost front-vehicle state estimation unit configured to, when a lost state occurs where a front vehicle detected by the object detection unit is not detected, estimate a state of the front vehicle in the lost state; a route-length determination unit configured to determine whether or not a length of a scheduled traveling route of the own vehicle in the detection target range is shorter than a predetermined threshold; and a speed control unit configured to control a speed of the own vehicle so as to follow the front vehicle. The speed control unit is configured to, when the object detection unit detects the front vehicle, control the speed of the own vehicle using a detection value of the state of the front vehicle detected by the front vehicle state detection unit, and to, in the lost state, control the speed of the own vehicle using an estimation value of the state of the front vehicle by the lost front-vehicle state estimation unit based on a positive determination result by the route-length determination unit as a necessary condition (a first aspect of the invention).

In the present invention, the determination result by the route-length determination unit is negative when the length of the scheduled traveling route of the own vehicle in the detection target range is relatively long. That is, in such a situation, the object detection unit can detect the front vehicle on the scheduled traveling route at a relatively distant position on the scheduled traveling route.

This means that, when the lost state of the front vehicle occurs, the situation where the determination result by the route-length determination unit is negative can be considered when the front vehicle deviates from the scheduled traveling route of the own vehicle by turning right or left and so the front vehicle is no longer the vehicle to be followed.

On the other hand, when the lost state of the front vehicle occurs, the situation where the determination result by the route-length determination unit is positive more likely occurs when, although the front vehicle travels along the scheduled traveling route, the front vehicle travels while cornering along a curve area having relatively large curvature on the scheduled traveling route, for example, and so such a lost state occurs.

Then, in the first aspect of the invention, when the object detection unit detects the front vehicle, the speed control unit controls the speed of the own vehicle using a detection value of the state of the front vehicle detected by the front vehicle state detection unit. Then, in the lost state, the speed control unit controls the speed of the own vehicle using an estimation value of the state of the front vehicle by the lost front-vehicle state estimation unit based on a positive determination result by the route-length determination unit as a necessary condition.

This can prevent the cruise-control of the own vehicle so as to follow the front vehicle in a lost state when such a front vehicle deviates from the scheduled traveling route of the own vehicle and is no longer the object to be followed.

On the other hand, when it is likely that the front vehicle travels along the scheduled traveling route, the speed of the own vehicle can be continuously controlled so as to follow the front vehicle.

In this way, when a lost state occurs so that the front vehicle cannot be detected, the own vehicle can travel appropriately.

In the first aspect of the invention, it is preferable that the lost front-vehicle state estimation unit is configured to, when the lost state occurs, estimate a boundary position of the detection target range on the scheduled traveling route of the own vehicle at a time when the lost state occurs firstly as a position of the front vehicle when the lost state occurs firstly (a second aspect of the invention).

Note here that the boundary position may not be a "boundary position" in a strict sense. That is, the boundary position may be a position in the vicinity of the "boundary position" in a strict sense.

According to the second aspect of the invention, the position estimated as the position of the front vehicle when such a lost state occurs firstly is the boundary position. This means the position closest to the own vehicle out of the positions where the front vehicle cannot be detected (the positions outside of the detection target range) along the scheduled traveling route.

Herein the "position closest to the own vehicle" refers to the position having the shortest or substantially the shortest length of the scheduled traveling route between the position and the own vehicle.

This allows the speed control unit to control the speed of the own vehicle, when the lost state occurs and the determination result by the route-length determination unit is positive, so as to prevent the own vehicle from approaching too close to the actual front vehicle.

In the first or the second aspect of the invention, the cruise controller further includes: an own-vehicle stoppable speed determination unit configured to determine an own vehicle stoppable speed being a speed of the own vehicle immediately before braking and more than zero and enabling the own vehicle to stop in the detection target area assuming that the braking is performed in the scheduled traveling route of the own vehicle in the detection target range, the own vehicle stoppable speed being determined in accordance with a length of the scheduled traveling route of the own vehicle at least in the detection target range. In the lost state, the lost front-vehicle state estimation unit is configured to estimate, as the speed of the front vehicle, the speed of the own vehicle that is successively determined by the own-vehicle stoppable speed determination unit (a third aspect of the invention).

According to such a third aspect of the invention, when the lost state occurs, the speed of the front vehicle is virtually (tentatively) estimated so that the front vehicle travels with the same speed as the own vehicle stoppable speed along the scheduled traveling route.

That is, when the lost state occurs and the determination result by the route-length determination unit is positive, the speed control unit can control the speed of the own vehicle in a similar manner to the state before the occurrence of the lost state (the situation where the front vehicle is detected).

In this case, the own vehicle stoppable speed is a speed of the own vehicle immediately before the braking that enables the own vehicle to stop in the detection target area assuming that braking of the own vehicle is performed in the scheduled traveling route of the own vehicle in the detection target range. That is, the speed of the own vehicle can be controlled so as to let the own vehicle stop in the detection target range when braking of the own vehicle in the lost state is performed during traveling as needed.

That is, assuming the case where the actual front vehicle in the lost state stops along the scheduled traveling route outside of the detection target range, and when such a front vehicle is detected again by the object detection unit, braking of the own vehicle allows the speed of the own vehicle to be controlled so as to prevent the own vehicle from approaching too close to the front vehicle.

In the third aspect of the invention, the cruise controller further includes: a solo-traveling target speed setting unit configured to set a target speed of the own vehicle assuming that the own vehicle travels solo along the scheduled traveling route. Preferably, the own-vehicle stoppable speed determination unit is configured to, assuming that braking of the own vehicle is performed with predetermined deceleration/acceleration in the scheduled traveling route of the own vehicle in the detection target range, calculate an upper limit speed of the own vehicle immediately before the braking enabling stopping of the own vehicle in the detection target range based on the deceleration/acceleration and a length of the scheduled traveling route of the own vehicle in the detection target range, and determine, as the own-vehicle stoppable speed, a smaller speed between the upper limit speed and a target speed set by the solo-traveling target speed setting unit (a fourth aspect of the invention)

The state where the own vehicle travels solo along the scheduled traveling route refers to the state where the own vehicle alone travels along the scheduled traveling route, along which no other vehicles or objects such as obstacles are present.

According to the fourth aspect of the invention, a target speed set by the solo-traveling target speed setting unit is the target speed of the own vehicle assuming that the own vehicle travels solo along the scheduled traveling route. This means that an optimum target speed can be set when the own vehicle travels solo along the scheduled traveling route.

Then, the speed of the front vehicle in the lost state that is estimated by the lost front-vehicle state estimation unit is a smaller speed between the target speed set by the solo-traveling target speed setting unit and the upper limit speed.

That is, in the situation where the lost state occurs and the determination result by the route-length determination unit is positive, the speed of the own vehicle can be controlled so as to be close to the target speed set by the solo-traveling target speed setting unit or the upper limit speed while satisfying the condition of enabling the own vehicle to stop in the detection target range.

As a result, in the situation where the lost state occurs and the determination result by the route-length determination unit is positive, the own vehicle can travel so as not to be excessively slow.

In the third aspect or the fourth aspect of the invention, it is preferable that in the lost state, the lost front-vehicle state estimation unit is configured to estimate a position of the front vehicle so as to move the position of the front vehicle with a speed agreeing with an estimation value of the speed of the front vehicle (a fifth aspect of the invention).

According to the fifth aspect of the invention, in the lost state, estimation can be made appropriately so as to achieve the mutual consistency of the position and the speed of the front vehicle. This accordingly can control the speed of the vehicle smoothly in the situation where the lost state occurs and the determination result by the route-length determination unit is positive.

In the first to the fifth aspects of the invention, the object detection unit may include a camera that is installed in the own vehicle so as to shoot an image in front of the own vehicle. In this case, the predetermined detection target range is a range specified by an angle of view of the camera (a sixth aspect of the invention).

DESCRIPTION OF THE PREFERRED EMBODIMENTS

Figure 1:
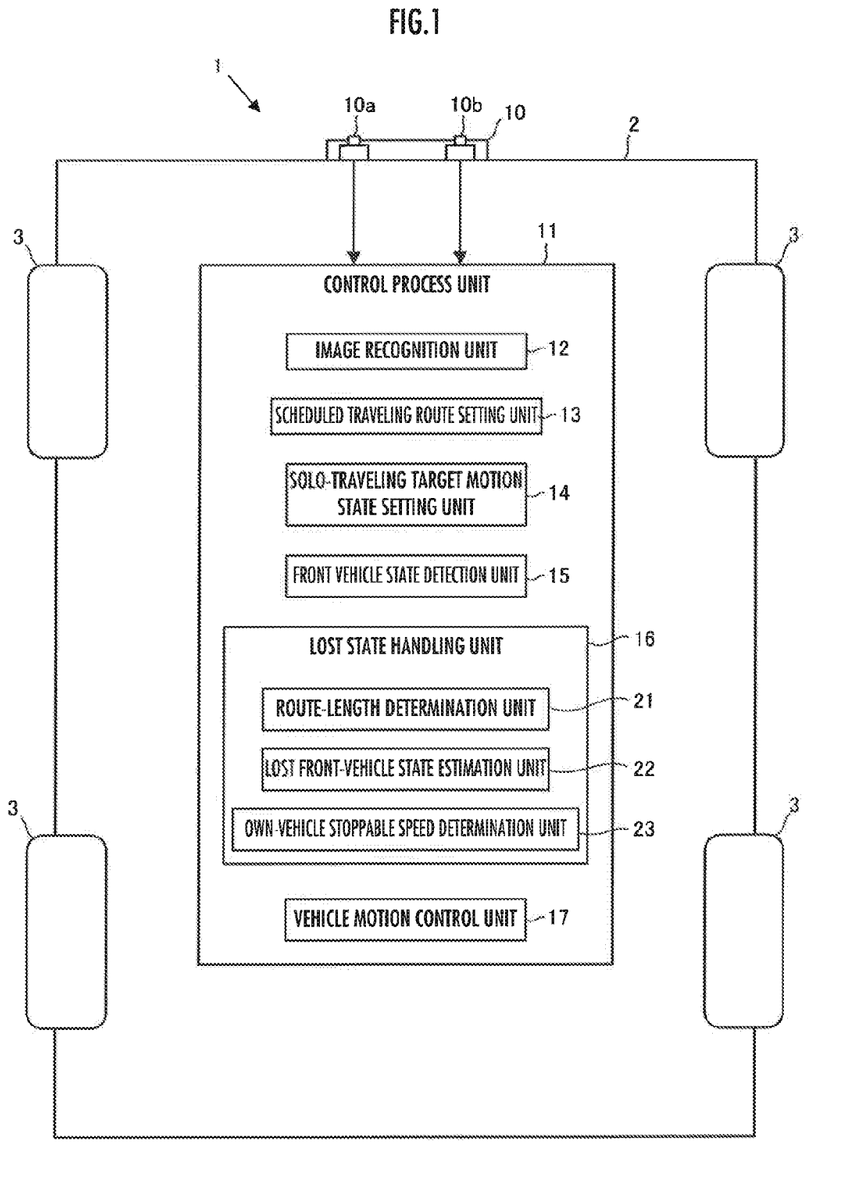
FIG. 1 illustrates the system configuration of a cruise controller that is one embodiment of the present invention.

Referring to FIGS. 1 to 5, the following describes one embodiment of the present invention. Referring to FIG. 1, a cruise controller 1 of the present embodiment is installed in a vehicle 2 as the own vehicle. The vehicle 2 is configured to transmit the output from a power source such as an internal combustion engine or an electric motor (not illustrated) to a drive wheel among wheels 3 for traveling. The vehicle 2 illustrated in FIG. 1 is a vehicle having four wheels 3 as one example. Herein the vehicle 2 may be a vehicle having four or more wheels, three-wheeled or two-wheeled vehicles or unicycles.

The cruise controller 1 includes a camera 10 making up an object detection unit and a control process unit 11.

Figure 2A:
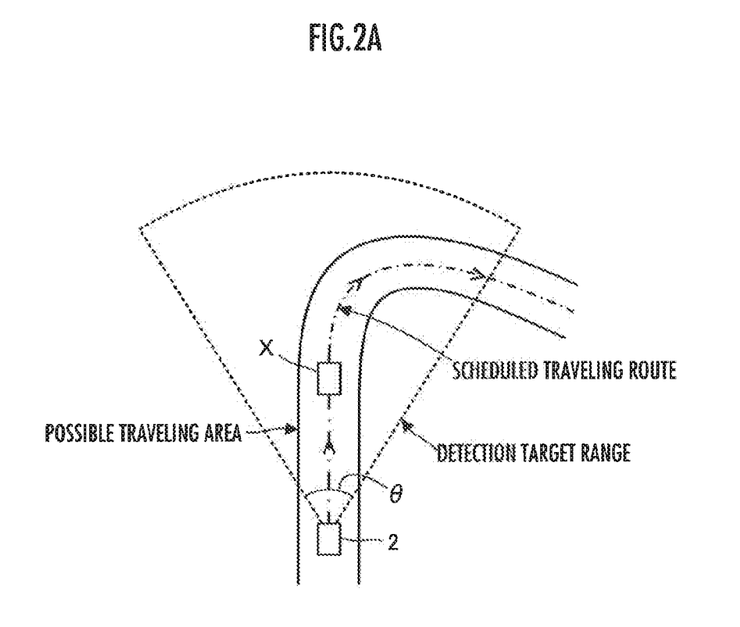
FIG. 2A illustrates an exemplary situation where a front vehicle is detected in a detection target range.

The camera 10 in the present embodiment is a stereo camera including two cameras 10a and 10b. This camera 10 is installed in the vehicle 2 so as to shoot an image of a predetermined detection target range on the front side of the own vehicle 2. As illustrated in FIG. 2A, such a detection target range (shooting range of the camera 10) is specified by an angle of view θ of the camera 10.

The camera 10 may not be a stereo camera. The camera 10 used may be in the form of a monocular camera.

The control process unit 11 is an electronic circuit unit including a CPU, a RAM, a ROM, an interface circuit and the like that are not illustrated. The control process unit 11 may include a single electronic circuit unit or a plurality of electronic circuit units capable of mutually communicating.

This control process unit 11 includes a functional unit relating to the present invention that plays a function implemented with a program implemented or a hardware configuration.

That is, the control process unit 11 includes: an image recognition unit 12 that recognizes an image of a vehicle traveling in front X located on the detection target range from an image shot with the camera 10; a scheduled traveling route setting unit 13 that seta a route along which the own vehicle 2 is supposed to travel; a solo-traveling target motion state setting unit 14 that sets a target motion state such as a target speed of the own vehicle 2 assuming that the vehicle 2 travels solo along the scheduled traveling route; a front vehicle state detection unit 15 that detects the actual motion state such as the position or the speed of the front vehicle X that is recognized by the image recognition unit 12; a lost state handling process unit 16 that, when a lost state occurs so that the front vehicle X cannot be detected from the image shot with the camera 10, executes predetermined control processing for such a lost state; and a vehicle motion control unit 17 that controls the motion state such as the speed of the own vehicle 2.

The lost state handling process unit 16 includes a route-length determination unit 21 that determines whether or not the length of the scheduled traveling route of the own vehicle 2 in the detection target range is shorter than a predetermined threshold; a lost front-vehicle state estimation unit 22 that tentatively estimates the motion state such as the position or the speed of the front vehicle X so as to allow the own vehicle 2 to follow the front vehicle X; and an own-vehicle stoppable speed determination unit 23 that determines the speed immediately before the braking of the own vehicle 2 that enables the own vehicle 2 to stop in the detection target area (hereinafter the speed is called an own vehicle stoppable speed) assuming that braking (braking after the current time) is performed in the scheduled traveling route of the own vehicle 2.

The image recognition unit 12 in the present embodiment is a functional unit making up the object detection unit of the present invention together with the camera 10. In this case, when an image of the front vehicle X traveling ahead of the own vehicle 2 along the scheduled traveling route of the own vehicle 2 is shown in the image shot with the camera 10, recognition of such an image of the front vehicle X by the image recognition unit 12.

Then if the front vehicle X that was shown in the image shot with the camera 10 is not shown in such an image, and accordingly the image recognition unit 12 cannot recognize the image of the front vehicle X from the shot image, then such a state corresponds to a lost state of the front vehicle X.

The solo-traveling target motion state setting unit 14 is a functional unit having a function as a solo-traveling target speed setting unit of the present invention, the front vehicle state detection unit 15 is a functional unit corresponding to a front vehicle state detection unit of the present invention, and the vehicle motion control unit 17 is a function unit having a function as a speed control unit of the present invention.

Then the route-length determination unit 21, the lost front-vehicle state estimation unit 22 and the own-vehicle stoppable speed determination unit 23 of the lost state handling process unit 16 are functional units corresponding to a route-length determination unit, a lost front-vehicle state estimation unit, and an own-vehicle stoppable speed determination unit of the present invention, respectively.

The following describes control processing by the control process unit 11 in more details.

Firstly the following describes cruise control of the own vehicle 2 in a state where an image of the front vehicle X to be followed by the own vehicle 2 is recognized by the image recognition unit 12 from the image shot with the camera 10 (the state to detect the front vehicle X).

The control process unit 11 makes the scheduled traveling route setting unit 13 set a scheduled traveling route of the own vehicle 2 with a predetermined control processing period successively.

Specifically the control process unit 11 acquires detection data of the own vehicle 2 on the position, the posture, the speed and the yaw rate, the map information around the own vehicle 2 and information on an object of a predetermined type (other vehicles, pedestrians, obstacles and the like) existing around the own vehicle 2 (hereinafter called external world object information) successively.

In this case, such detection data is obtained from the output of a GPS receiver, a speed sensor, a yaw rate sensor and an acceleration sensor installed in the own vehicle 2 which are not illustrated, for example.

The map information is obtained from a recording medium (a hard disk, a DVD or the like) installed in the own vehicle 2 that is not illustrated or is acquired from an external server via wireless communication, for example.

The external world object information is information representing the type of an object, the position and the speed thereof relative to the own vehicle 2, for example. Such external world object information is acquired based on the image shot with the camera 10, for example.

When the vehicle 2 includes an object detection device other than the camera 10, such as a radar, the external world object information can be obtained based on the output on a search result of the radar instead of the image shot with the camera 10 or based on the shot image in combination with the output on a search result of the radar. When an object in the external word and the own vehicle 2 can communicate with each other, for example, the entire or a part of the external world object information can be obtained through such a communication.

Then the scheduled traveling route setting unit 13 sets a scheduled traveling route (scheduled traveling route from the current position) of the own vehicle 2 on the basis of the detection data, the map information and the external world object information. In this case, the scheduled traveling route is basically set in a possible traveling area (traveling lane) of the own vehicle 2 that is recognized from the current position of the own vehicle 2 and the map information so as to extend along the possible traveling area. For instance, as illustrated in FIG. 2A, a scheduled traveling route of the own vehicle 2 is set to pass through the center in the width direction of the possible traveling area of the own vehicle 2.

Note here that if the own vehicle 2 and an object in the external world may come into contact on the scheduled traveling route in the future on the basis the detection data such as the speed and the yaw rate of the own vehicle 2 and the external world object information, the scheduled traveling route of the own vehicle 2 is set so as to detour such an object.

The control process unit 11 further makes the solo-traveling target motion state setting unit 14 execute processing to set a target motion state such as a target speed of the own vehicle 2 assuming that the own vehicle 2 travels solo along the scheduled traveling route (hereinafter this state is called a target motion state during solo traveling).

Specifically the situation where the own vehicle 2 travels solo along the scheduled traveling route refers to the situation where the own vehicle 2 alone travels along the scheduled traveling route, along which vehicles other than the own vehicle 2 or objects such as obstacles are not present.

Specifically the target motion state during solo traveling set by the solo-traveling target motion state setting unit 14 includes a target motion state of the own vehicle 2 at each of a plurality of points (e.g., points at constant intervals) along the scheduled traveling route. In this case, the target motion state of the own vehicle 2 at each position along the scheduled traveling route is made up of target posture, a target speed, a target yaw rate and the like at the position in the yaw direction of the own vehicle 2.

Then the target motion state during solo traveling is set so as to obtain smooth traveling along the scheduled traveling route with the traveling pattern that is supposed beforehand as an ideal traveling pattern of the own vehicle 2.

For example, the target speed of the own vehicle 2 is set based on the maximum limiting values of the lateral acceleration and speed of the own vehicle 2 and the curvature of the scheduled traveling route, and it is set under the limiting condition such that the lateral acceleration and the speed of the own vehicle 2 can be kept to be their predetermined maximum limiting values or lower, and so that the own vehicle 2 can travel along the scheduled traveling route as fast as possible (with the speed agreeing with the maximum limiting value or closer thereto as much as possible).

In this case, in the straight-line area of the scheduled traveling route, the target speed is set so that the speed of the own vehicle 2 is brought closer to the maximum limiting value before the vehicle reaching a deceleration area before a curve area and the own vehicle 2 is decelerated beforehand at the deceleration area before the curve area. In a curve area of the scheduled traveling route, the target speed is set so that the magnitude of the lateral acceleration of the own vehicle 2, which is specified in accordance with the target speed of the own vehicle 2 and the curvature of the scheduled traveling route, can be kept to the maximum limiting value of the lateral acceleration or less and so that the target speed is brought as close as possible to the maximum limiting value of the speed.

Then the target yaw rate of the own vehicle 2 at each position along the scheduled traveling route is calculated from the target speed and the curvature of the scheduled traveling route at the position. The target posture of the own vehicle 2 at each position along the scheduled traveling route is set so that the front-back direction of the own vehicle 2 is along the tangential direction of the scheduled traveling route at the position, for example.

The target motion state during solo traveling may be set as a traveling pattern other than the above (e.g., a traveling pattern minimizing a change in speed of the own vehicle 2, or a traveling pattern yielding favorable energy efficiency of the own vehicle 2). Various patterns in a feasible range can be used for the traveling pattern of the own vehicle 2 that specifies the target motion state during solo traveling.

The control process unit 11 makes the image recognition unit 12 execute the processing of recognizing an image of the front vehicle X from an image shot with the camera 10 with a predetermined control processing period, thereby detecting the front vehicle X existing in the detection target range successively.

In this case, the image recognition unit 12 recognizes an image of the vehicle X traveling ahead of the own vehicle 2 along the scheduled traveling route of the own vehicle 2 in the detection target range from an image shot with the camera 10 for each predetermined control processing period by a known method based on features of the image such as a shape pattern, a brightness-distribution pattern and the like. Such a recognition method used may be any known method.

In this way, an image of the front vehicle X is recognized from the image shot with the camera 10, whereby the front vehicle X existing in the detection target area can be detected. For instance, in the situation illustrated in FIG. 2A, the front vehicle X in the drawing is detected.

Then in the situation where the front vehicle X existing in the detection target area is detected as stated above, the control process unit 11 makes the front vehicle state detection unit 15 detect the actual motion state of the front vehicle X such as the position and the speed.

In this case, the position of the front vehicle X relative to the own vehicle 2 can be detected successively by a method of stereo distance measurement using an image shot with the camera 10 (stereo camera), for example. Then the speed of the front vehicle X can be detected successively from the temporal change rate of the relative position (i.e., the speed of the front vehicle X relative to the own vehicle 2) and the detection value of the speed of the own vehicle 2.

The yaw rate of the front vehicle X can be detected from the curvature of the scheduled traveling route (curvature at the position where the front vehicle X exists) and the detection value of the speed of the front vehicle X, for example.

In the situation where the front vehicle X existing in the detection target area is detected as stated above, the control process unit 11 makes the vehicle motion control unit 17 control the motion state of the own vehicle 2 such as the speed so as to let the own vehicle 2 follow the front vehicle X.

Specifically when the distance between the own vehicle 2 and the front vehicle X, which is recognized from the relative position of the front vehicle X detected at the front vehicle state detection unit 15, is lower than a predetermined lower-limit distance between vehicles, the vehicle motion control unit 17 sets the target speed of the own vehicle 2 at zero.

Then the vehicle motion control unit 17 brakes the own vehicle 2 by activating a brake device not illustrated of the own vehicle 2 until the actual speed of the own vehicle 2 is decelerated to zero (i.e., until the own vehicle 2 stops).

When the distance between the own vehicle 2 and the front vehicle X is the predetermined lower-limit distance or more, the vehicle motion control unit 17 sets the speed of the front vehicle X that is detected at the front vehicle state detection unit 15 as the maximum acceptable value of the speed of the own vehicle 2.

Then the vehicle motion control unit 17 sets the target motion state of the own vehicle 2 along the scheduled traveling route (the target motion state at the positions of a plurality of points along the scheduled traveling route of the own vehicle 2) by the processing similar to that by the solo-traveling target motion state setting unit 14. In this case, the target speed of the own vehicle 2 is set under the limiting condition such that the speed of the own vehicle 2 can be kept to be the maximum acceptable value (the detection value of the speed of the front vehicle X) or less and the lateral acceleration of the own vehicle 2 can be kept to be a predetermined maximum limiting value or less, and so that the own vehicle 2 can travel along the scheduled traveling route as fast as possible (with the speed agreeing with the maximum acceptable value or closer thereto as much as possible).

For instance, at a position where the magnitude of the lateral acceleration of the own vehicle 2 can be kept to be the maximum limiting value or less (e.g., a position in the straight-line area of the scheduled traveling route), the target speed of the own vehicle 2 is set closer to the detection value of the vehicle of the front vehicle X or so as to agree with the detection value. Then at a position such that, if the target speed of the own vehicle 2 agrees with the detection value of the speed of the front vehicle X, then the magnitude of the lateral acceleration of the own vehicle 2 exceeds the maximum limiting value (a position having relatively large curvature of the scheduled traveling route), the target speed of the own vehicle 2 is set at a value smaller than the detection value of the speed of the front vehicle X and so that the magnitude of the lateral acceleration is the maximum limiting value or less.

Then the target yaw rate of the own vehicle 2 is calculated from the target speed of the own vehicle 2 and the curvature of the scheduled traveling route. The target posture of the own vehicle 2 at each position along the scheduled traveling route is set so that the front-back direction of the own vehicle 2 is along the tangential direction of the scheduled traveling route at the position, for example.

Then the vehicle motion control unit 17 controls the output of the power source not illustrated (such as an internal combustion engine or an electric motor) of the own vehicle 2, the gear position of the gearbox, the braking force of the braking device, the driving force of the steering actuator and the like so as to achieve the target motion state set as stated above.

In this case, the target motion state of the own vehicle 2 at a position between mutually adjacent positions of the plurality of positions along the scheduled traveling route, each of which the target motion state is set, is determined by interpolation.

As a result, the own vehicle 2 will travel to follow the front vehicle X. In this case, the speed of the own vehicle 2 is controlled to be the speed of the front vehicle X or less. This can prevent the own vehicle 2 from gradually approaching the front vehicle X.

When the distance between the own vehicle 2 and the front vehicle X is the aforementioned lower-limit distance or more, the target motion state of the own vehicle 2, e.g., the speed of the own vehicle 2, can be set so that the distance between the own vehicle 2 and the front vehicle X agrees or substantially agrees with a target distance between vehicles set in accordance with the detection value of the speed of the own vehicle 2 or the like.

When the front vehicle X is detected based on the image shot with the camera 10, cruise control is performed for the own vehicle 2 as stated above.

Meanwhile when the scheduled traveling route of the own vehicle 2 includes a curve area having a relatively large curvature (sharp curve), the front vehicle X may deviate from the detection target range when traveling along such a curve area. For instance, when the own vehicle 2 and the front vehicle X traveling in the situation of FIG. 2A reach the situation illustrated in FIG. 2B, then the front vehicle X deviates from the detection target area in the situation of FIG. 2B.

Figure 2B:
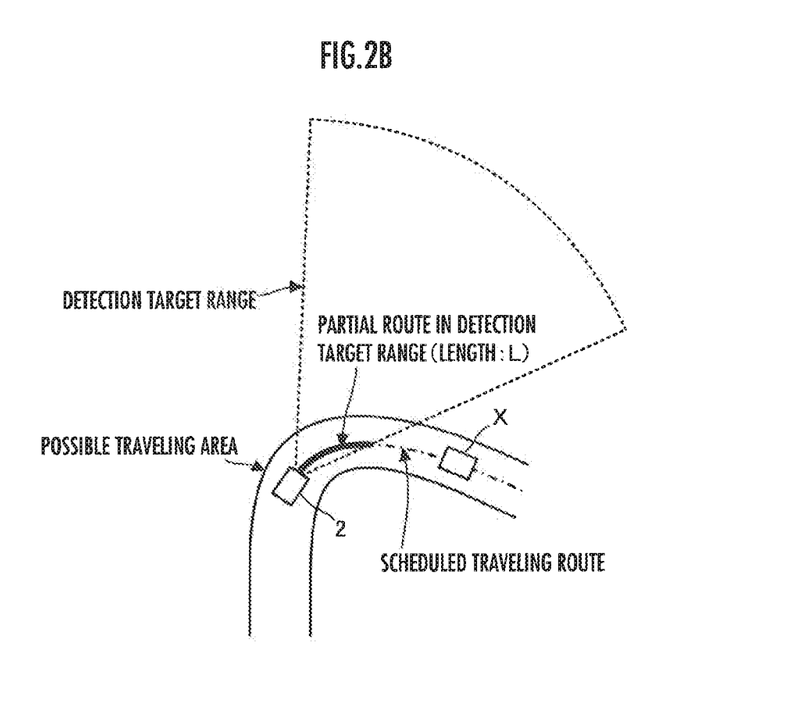
FIG. 2B illustrates an exemplary situation where a front vehicle is not detected in a detection target range (a lost state occurs).

In this state, since the front vehicle X is not captured in the image shot with the camera 10, then this state is a lost state where the front vehicle X cannot be detected. Such a lost state may occur when the front vehicle X moves to another route from the scheduled traveling route of the own vehicle 2 because the front vehicle X or the own vehicle 2 turns right or left, for example. A sharp curve of the scheduled traveling route where the lost state of the front vehicle X may occur may be a turning point of the own vehicle 2 along the scheduled traveling route where the vehicle turns right or left.

When such a lost state occurs, the control process unit 11 executes the processing by the lost state handling process unit 16, and controls the motion state such as the speed of the own vehicle 2 using data obtained from such processing, for example.

The following describes this control processing.

Figure 3:
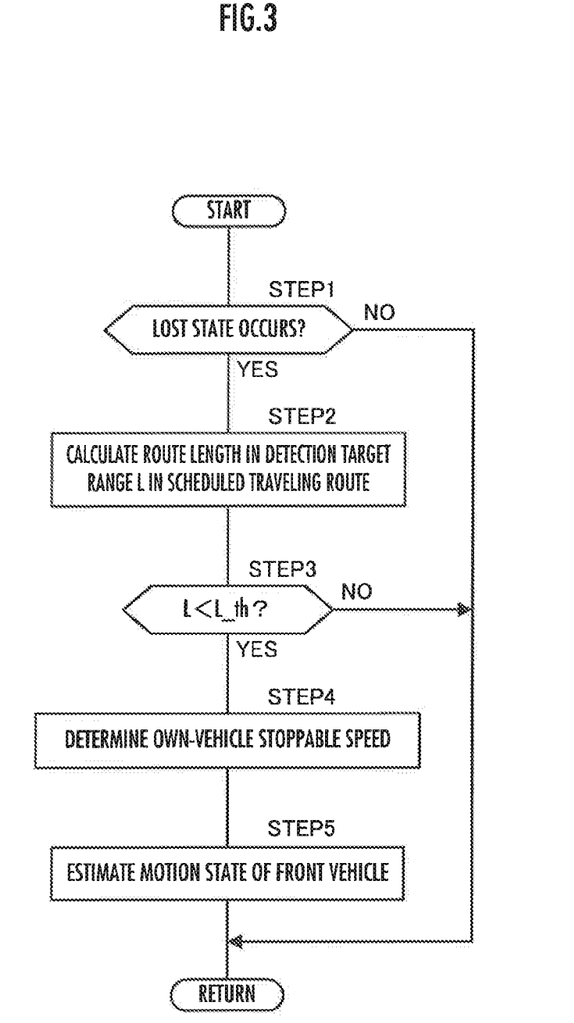
FIG. 3 is a flowchart illustrating the control processing for a lost state handling process unit of the control process unit of FIG. 1.

In the state of performing cruise control of the own vehicle 2 so as to follow the front vehicle X as stated above, the control process unit 11 executes the processing illustrated in the flowchart of FIG. 3 with a predetermined control processing period.

Firstly at STEP 1, the control process unit 11 determines whether a lost state of the front vehicle X occurs or not.

In this case, when the front vehicle X is detected based on the image shot with the camera 10 in the control processing period last time and when the front vehicle X is detected in the control processing period this time as well, the determination result at STEP 1 becomes negative. In this case, the processing of the flowchart in FIG. 3 in the control processing period this time ends.

When the front vehicle X is detected based on the image shot with the camera 10 in the control processing period last time but the front vehicle X is not detected at the control processing period this time, the determination result at STEP 1 becomes positive. When the determination result at STEP 1 changes from negative to positive, then the determination result at STEP 1 is kept at positive until the front vehicle X is detected again or newly detected or when the determination result at STEP 3 described later is negative.

When the determination result at STEP 1 is positive, the control process unit 11 executes the processing by the lost state handling process unit 16.

During the processing by the lost state handling process unit 16, firstly at STEPs 2 and 3, the processing by the route-length determination unit 21 is executed. At STEP 2, the route-length determination unit 21 calculates the length of a part of the scheduled traveling route in the detection target range (the length from the current position of the own vehicle 2 to the boundary position of the detection target range, hereinafter called a route length in detection target range L).

Specifically the route-length determination unit 21 specifies a part of the scheduled traveling route in the detection target range (hereinafter called a partial route in detection target range) on the basis of the spatial coordinates data of the scheduled traveling route viewed from the current position of the own vehicle 2 and the spatial coordinates data of the detection target range (this is determined beforehand in the relative position and the orientation relationship relative to the own vehicle 2) viewed from the current position of the own vehicle 2. Then the route-length determination unit 21 calculates the length of the partial route in detection target range (the length along the scheduled traveling route) as the route length in detection target range L.

For instance, in the situation illustrated in FIG. 2B, the part indicated with bold lines in the scheduled traveling route is the partial route in detection target range, and the length of this partial route in detection target range is calculated as the route length in detection target range L.

The partial route in detection target range also can be specified on the basis of an image shot with the camera 10.

Next at STEP 3, the route-length determination unit 21 determines whether the route length in detection target range L calculated as stated above is shorter than a predetermined threshold L_th or not.

The negative determination result at STEP 3 results from the situation where a lost state of the front vehicle X occurs in spite of a sufficiently long route length in detection target range L (i.e., a distant area in the scheduled traveling route is included in the detection target range).

For such a situation, it is considered as the case where the front vehicle X moves to another route from the scheduled traveling route of the own vehicle 2 by turning right or left, for example, and no longer exists along the scheduled traveling route (the front vehicle X is no longer the target to be followed by the own vehicle 2).

Then when the determination result at STEP 3 is negative, the control process unit 11 ends the processing of the flowchart in FIG. 3.

In this case, the control process unit 11 subsequently performs cruise control of the own vehicle 2 so that the own vehicle 2 travels in the target motion state during solo traveling as stated above until a new front vehicle X is detected.

On the other hand, when the determination result at STEP 3 is positive, it is considered as the case where the front vehicle X deviates from the detection target range because it travels along a sharp curve (a position having relatively large curvature) on the scheduled traveling route of the own vehicle 2.

In this case, the front vehicle state detection unit 15 cannot detect the position, the speed or the like of the front vehicle X. Then in order to control the own vehicle 2 to follow the front vehicle X, the control process unit 11 executes the processing at STEPs 4 and 5, thereby tentatively estimating the motion state such as the position or the speed of the front vehicle X.

At STEP 4, the control process unit 11 makes the own-vehicle stoppable speed determination unit 23 determine the own-vehicle stoppable speed.

Specifically the own-vehicle stoppable speed determination unit 23 firstly calculates the upper limit value of the own-vehicle stoppable speed (hereinafter called an own-vehicle stoppable upper limit speed) that enables stopping of the own vehicle 2 in the detection target range assuming that braking operation of the own vehicle 2 is performed with predetermined deceleration/acceleration in the scheduled traveling route, based on the route length in detection target range L calculated by the route-length determination unit 21.

Such an own-vehicle stoppable upper limit speed can be said a speed enabling stopping of the own vehicle 2 at the terminal end (boundary position in the detection target range) of the partial route in detection target range assuming that braking operation of the own vehicle 2 is performed with predetermined deceleration/acceleration from the state where the speed of the own vehicle 2 at the starting end (current position of the own vehicle 2) of the partial route in detection target range is the own-vehicle stoppable upper limit speed. In this case, the predetermined deceleration/acceleration in the present embodiment is set at maximum deceleration/acceleration that can be realized by braking of the own vehicle 2, for example.

Herein let that Acc (<0) denotes the maximum deceleration/acceleration, Vs denotes the own-vehicle stoppable upper limit speed and is denotes time required for decelerating of the speed of the own vehicle 2 from Vs to zero, the following expressions (1) and (2) hold:

$$ts = -Vs/Acc \quad (1);$$

$$L = Vs \times ts + (\tfrac{1}{2}) \times Acc \times ts^2 \quad (2).$$

Then the following expression (3) can be derived from these expressions (1) and (2):

$$Vs = \sqrt{(2 \times |Acc| \times L)} \quad (3)$$

Note here that the right side in Expression (3) means the square route of (2×|Acc|×L).

Then the own-vehicle stoppable speed determination unit 23 calculates the right side of Expression (3) based on the current value of the route length in detection target range L of the scheduled traveling route calculated by the route-length determination unit 21, thus calculating the own-vehicle stoppable upper limit speed Vs. In this case, a predetermined value determined beforehand based on the experiment or the like is used as the value of the maximum deceleration/acceleration Acc.

When the speed of the own vehicle 2 is controlled to be such an own-vehicle stoppable upper limit speed Vs or lower, the own vehicle 2 can be stopped before reaching the terminal end (boundary position in the detection target range) of the partial route in detection target range by decelerating the own vehicle 2 with the maximum deceleration/acceleration Acc.

The own-vehicle stoppable speed determination unit 23 further compares the target speed of the own vehicle 2 at the current position that is specified by the amount of target motion state during solo traveling set by the solo-traveling target motion state setting unit 14 with the own-vehicle stoppable upper limit speed Vs.

Then the own-vehicle stoppable speed determination unit 23 determines, as the own-vehicle stoppable speed in the control processing period this time, a smaller speed between the target speed of the own vehicle 2 at the current position that is specified by the amount of target motion state during solo traveling and the own-vehicle stoppable upper limit speed Vs.

That is, when the target speed is Vs or more, Vs as it is is determined as the own-vehicle stoppable speed, and when the target speed is smaller than Vs, such a target speed smaller than Vs is determined as the own-vehicle stoppable speed.

Figure 5A:
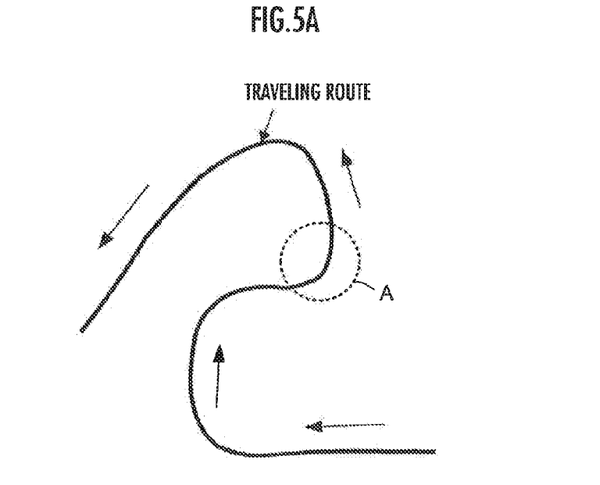
FIG. 5A illustrates an exemplary traveling route.
Figure 5B:
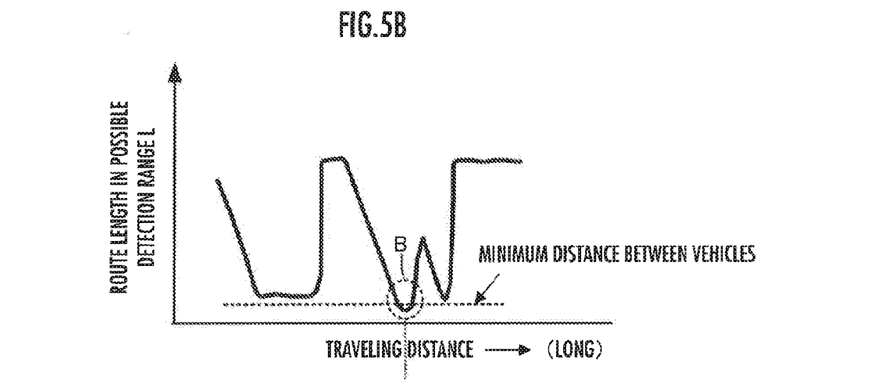
FIG. 5B is a graph illustrating an exemplary change in a route length in the detection target range.
Figure 5C:
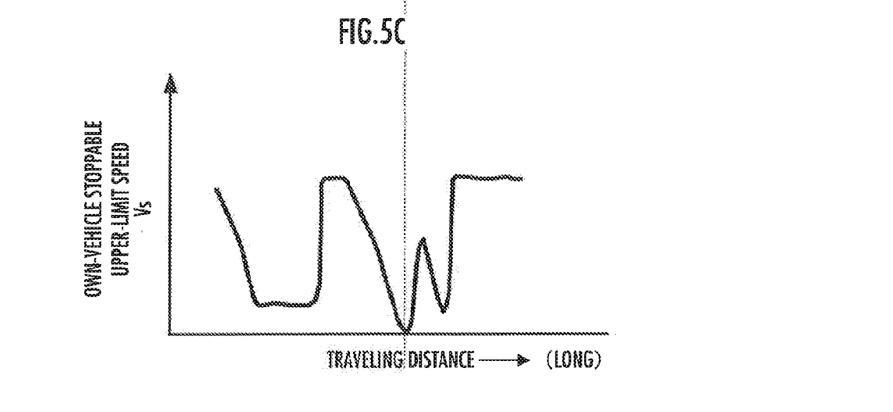
FIG. 5C is a graphs illustrating an exemplary change in own-vehicle stoppable speed.

Graphs illustrated in FIGS. 5B and 5C represent an example of a change in the route length in detection target range L and a change in the own-vehicle stoppable upper limit speed Vs, respectively, when the own vehicle 2 travels along the scheduled traveling route as illustrated in FIG. 5A.

In this case, when the own vehicle 2 travels at part A of FIG. 5A, the route length in detection target range L temporarily is smaller than the lower limit distance between vehicles (part B in FIG. 5B), but the own-vehicle stoppable upper limit speed Vs changes with a change in the route length in detection target range L as illustrated in FIG. 5C. As a result, when a lost state of the front vehicle X occurs at part A, the position and the speed of the front vehicle X can be estimated by the processing at STEP 5 described later as if the front vehicle X traveled along the scheduled traveling route of the own vehicle 2.

That is the details of the processing at STEP 4 (the processing by the own-vehicle stoppable speed determination unit 23).

Next at STEP 5, the control process unit 11 makes the lost front-vehicle state estimation unit 22 estimate the motion state such as the position and the speed of the front vehicle X in the lost state.

Specifically the lost front-vehicle state estimation unit 22 sets the own-vehicle stoppable speed that is set by the own-vehicle stoppable speed determination unit 23 at the above STEP 4 in each control processing period as the estimation value of the speed of the front vehicle X at a time of such a control processing period.

Then when the control processing period this time is the first control processing period when the determination result at the above STEP 1 changes from negative to positive (the first control processing period when the lost state occurs), the lost front-vehicle state estimation unit 22 sets the boundary position in the detection target range on the scheduled traveling route of the own vehicle 2 (i.e., the terminal end of the partial route in detection target range) as the estimation position of the front vehicle X at a time of the first control processing period.

Then in each control processing period the next time or later, the lost front-vehicle state estimation unit 22 calculates the estimation position of the front vehicle X in the control processing period this time by estimation processing such as using Kalman filter based on the estimation position, the estimation speed and the estimation yaw rate of the front vehicle X that are determined in the control processing period the last time.

This allows the calculation of the estimation position of the front vehicle X so that the front vehicle X moves with the speed agreeing with the estimation speed of the front vehicle X.

In this case, the estimation value of the yaw rate (estimation yaw rate) of the front vehicle X in each control processing period is calculated from the curvature of the scheduled traveling route at the estimation position of the front vehicle X that is determined in the control processing period, and the estimation speed of the front vehicle X.

Figure 4A:
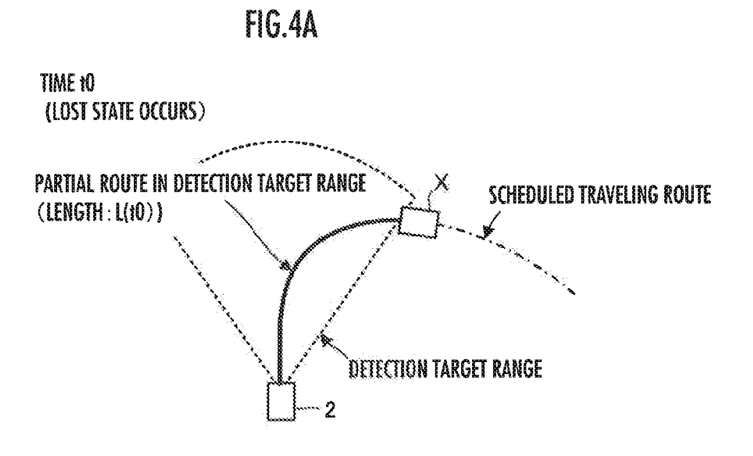
FIGS. 4A, 4B and 4C illustrate an exemplary change over time in position of the front vehicle that is estimated in the lost state.
Figure 4B:
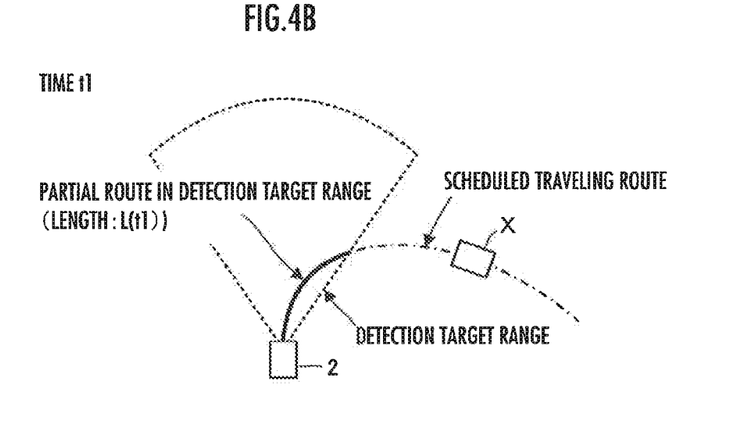
Figure 4C:
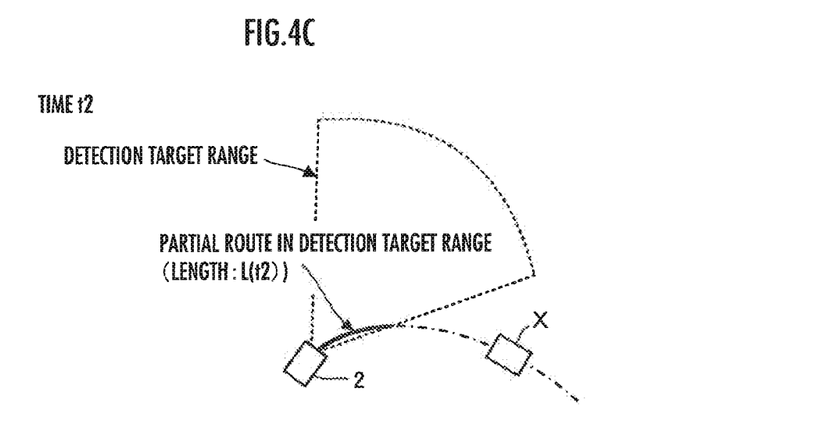

In this way, the motion state of the front vehicle X in the lost state is estimated, whereby the estimation position of the front vehicle X can be determined so as to change as illustrated in FIGS. 4A to 4C, for example That is, at time t0 (FIG. 4A) in the first control processing period where the lost state occurs, the estimation position of the front vehicle X is set at the boundary position of the detection target position on the scheduled traveling route (terminal end of the partial route in detection target range)

Then, the estimation speed of the front vehicle X at this time t0 is set at the own-vehicle stoppable speed enabling stopping of the own vehicle 2 within the distance of the route length L(t0) in the detection target range at time t0 (the own-vehicle stoppable upper limit speed calculated based on ≤L(t0)).

The estimation yaw rate of the front vehicle X at time t0 is calculated from the curvature of the scheduled traveling route corresponding to the estimation position of the front vehicle X at time t0 and the estimation speed of the front vehicle X at time t0.

At time t1 of the next control processing period following time t0 (FIG. 4B), the estimation position of the front vehicle X is calculated based on the estimation speed and the estimation yaw rate of the front vehicle X at time t0 in the control processing period the last time.

Then, the estimation speed of the front vehicle X at time t1 is set at the own-vehicle stoppable speed enabling stopping of the own vehicle 2 within the distance of the route length in the detection target range L(t1) at time t1 (the own-vehicle stoppable upper limit speed calculated based on ≤L(t1)).

The estimation yaw rate of the front vehicle X at time t1 is calculated from the curvature of the scheduled traveling route corresponding to the estimation position of the front vehicle X at time t1 and the estimation speed of the front vehicle X at time t1.

Then at time t2 of the next control processing period following time t1 (FIG. 4C), the estimation position of the front vehicle X is calculated based on the estimation speed and the estimation yaw rate of the front vehicle X at time t1 in the control processing period the last time.

Then, the estimation speed of the front vehicle X at time t2 is set at the own-vehicle stoppable speed enabling stopping of the own vehicle 2 within the distance of the route length in the detection target range L(t2) at time t2 (≤the own-vehicle stoppable upper limit speed calculated based on L(t2)).

The estimation yaw rate of the front vehicle X at time t2 is calculated from the curvature of the scheduled traveling route corresponding to the estimation position of the front vehicle X at time t2 and the estimation speed of the front vehicle X at time t2.

Subsequently the position, the speed and the yaw rate of the front vehicle X in each control processing period will be estimated in a similar manner.

That is the details of the processing at STEP 5 (the processing by the lost front-vehicle state estimation unit 22).

As stated above, after a lost state of the front vehicle X occurs, the motion state of the front vehicle X (position, speed, and yaw rate) is estimated tentatively and successively until the determination result at STEP 3 becomes negative (the route length in detection target range L becomes the predetermined threshold L_th or more).

Then, when the front vehicle X is in the lost state and the determination result at STEP 3 is positive, the control process unit 11 makes the vehicle motion control unit 17 perform cruise control of the vehicle 2 so as to follow the front vehicle X in the lost state while tentatively estimating the motion state of the front vehicle X such as the position as stated above. In this case, the vehicle motion control unit 17 controls the speed or the like of the own vehicle 2 by executing the control processing similarly to that performed when the front vehicle X is detected, using the position, the speed and the yaw rate of the front vehicle X estimated by the lost front-vehicle state estimation unit 22.

As a result, assuming that the front vehicle X in the lost state virtually travels in accordance with the position, the speed and the yaw rate that are estimated by the lost front-vehicle state estimation unit 22, the speed or the like of the own vehicle 2 can be controlled so as to follow such a front vehicle X.

In this case, the speed of the own vehicle 2 is controlled so that the speed thereof is brought closer to or agrees with the estimated speed of the front vehicle X in the range where the magnitude of the lateral acceleration of the own vehicle 2 does not exceed the maximum limiting value while setting the estimated speed of the front vehicle X as the acceptable maximum value of the speed of the own vehicle 2.

That is, when the front vehicle X is in the lost state and the determination result at STEP 3 is positive, the own vehicle 2 is controlled so as to travel with the speed agreeing with or close to the own-vehicle stoppable upper limit speed or the target speed specified by the target motion state during solo traveling as much as possible while keeping the speed enabling stopping in the detection target range with the braking at the degree of maximum deceleration (deceleration with the maximum deceleration/acceleration Acc).

According to the embodiment described above, when a lost state of the front vehicle X occurs and the determination result at STEP 3 becomes negative, the own vehicle 2 is not controlled to follow the front vehicle X in the lost state. This can avoid the cruise-control of the own vehicle 2 so as to follow the front vehicle X that deviates from the scheduled traveling route of the own vehicle 2.

On the other hand, when a lost state of the front vehicle X occurs and the determination result at STEP 3 becomes positive, the motion state of the front vehicle X such as the position and the speed is estimated tentatively as stated above. As a result, the own vehicle 2 can travel smoothly along the scheduled traveling route with the speed that is not too slow while securing the state of being stoppable in the detection target range.

Even when the actual front vehicle X stops at a position outside of the detection target range, braking operation may be performed to the own vehicle 2 so as to stop the own vehicle 2 immediately after detecting the front vehicle X again, thereby preventing the own vehicle 2 from excessively approaching the front vehicle X.

The embodiment described above includes the camera 10 as an element of the object detection unit. Instead of the camera 10 or in combination with the camera 10, a radar may be included.

The embodiment described above is configured so that, during the processing by the front vehicle state detection unit 15 and the lost front-vehicle state estimation unit 22, both of the position and the speed of the front vehicle X is detected or estimated. When such control to let the own vehicle 2 follow the front vehicle X is performed based on the position of the front vehicle X, another embodiment of detecting or estimating the position of the front vehicle X only can be used. Alternatively, when such control to let the own vehicle 2 follow the front vehicle X is performed based on the speed of the front vehicle X, still another embodiment of detecting or estimating the speed of the front vehicle X only can be used.

What is claimed is:

1. A cruise controller installed in a vehicle as an own vehicle that performs cruise control of the own vehicle so as to follow a front vehicle traveling ahead of the own vehicle, comprising:
an object detection unit configured to detect, in a predetermined detection target range on a front side of the own vehicle, the front vehicle existing in the predetermined detection target range;
a front vehicle state detection unit configured to detect a state of the front vehicle, including at least any one of a position or a speed of the front vehicle that is detected by the object detection unit;
a lost front-vehicle state estimation unit configured to, when a lost state occurs where the front vehicle detected by the object detection unit is not detected, estimate a state of the front vehicle in the lost state;
a route-length determination unit configured to determine whether or not a length of a scheduled traveling route of the own vehicle in the detection target range is shorter than a predetermined threshold; and
a speed control unit configured to control a speed of the own vehicle so as to follow the front vehicle, wherein the speed control unit is configured to, when the object detection unit detects the front vehicle, control the speed of the own vehicle using a detection value of the state of the front vehicle detected by the front vehicle state detection unit, and to, in the lost state, control the speed of the own vehicle using an estimation value of the state of the front vehicle by the lost front-vehicle state estimation unit based on a positive determination result by the route-length determination unit as a necessary condition.

2. The cruise controller according to claim 1, wherein the lost front-vehicle state estimation unit is configured to, when the lost state occurs, estimate a boundary position of the detection target range on the scheduled traveling route of the own vehicle at a time just before the lost state occurs fir as a position of the front vehicle at the time just before the lost state occurs.

3. The cruise controller according to claim 1, further comprising:
an own-vehicle stoppable speed determination unit configured to determine an own vehicle stoppable speed being a speed of the own vehicle immediately before braking and more than zero and enabling the own vehicle to stop in the detection target area assuming that the braking is performed in the scheduled traveling route of the own vehicle in the detection target range, the own vehicle stoppable speed being determined in accordance with a length of the scheduled traveling route of the own vehicle at least in the detection target range, wherein
in the lost state, the lost front-vehicle state estimation unit is configured to estimate, as the speed of the front vehicle, the speed of the own vehicle that is successively determined by the own-vehicle stoppable speed determination unit.

4. The cruise controller according to claim 3, further comprising:
a solo-traveling target speed setting unit configured to set a target speed of the own vehicle assuming that the own vehicle travels solo along the scheduled traveling route, wherein
the own-vehicle stoppable speed determination unit is configured to, assuming that braking of the own vehicle is performed with predetermined deceleration/acceleration in the scheduled traveling route of the own vehicle in the detection target range, calculate an upper limit speed of the own vehicle immediately before the braking enabling stopping of the own vehicle in the detection target range based on the deceleration/acceleration and a length of the scheduled traveling route of the own vehicle in the detection target range, and determine, as the own-vehicle stoppable speed, a smaller speed between the upper limit speed and a target speed set by the solo-traveling target speed setting unit.

5. The cruise controller according to claim 3, wherein
in the lost state, the lost front-vehicle state estimation unit is configured to estimate a position of the front vehicle so as to move the position of the front vehicle with a speed agreeing with an estimation value of the speed of the front vehicle.

6. The cruise controller according to claim 1, wherein
the object detection unit includes a camera that is installed in the own vehicle so as to shoot an image in front of the own vehicle, and the predetermined detection target range is a range specified by an angle of view of the camera.

* * * * *